(12) United States Patent
Mok et al.

(10) Patent No.: US 9,374,265 B1
(45) Date of Patent: Jun. 21, 2016

(54) GFP FRAME FILTER

(71) Applicant: PMC-Sierra US, Inc., Sunnyvale, CA (US)

(72) Inventors: Winston Ki-Cheong Mok, Vancouver (CA); Jayeshkumar Roonwal, Bangalore (IN); Kishor Ashanand Ruparel, Bangalore (IN)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 35 days.

(21) Appl. No.: 13/839,249

(22) Filed: Mar. 15, 2013

Related U.S. Application Data

(60) Provisional application No. 61/709,009, filed on Oct. 2, 2012.

(51) Int. Cl.
H04L 29/08 (2006.01)
H04L 29/06 (2006.01)

(52) U.S. Cl.
CPC .................................. *H04L 29/0653* (2013.01)

(58) Field of Classification Search
None
See application file for complete search history.

(56) References Cited

U.S. PATENT DOCUMENTS 6,359,886 B1  3/2002  Ujihara et al.
7,304,952 B2  12/2007  Scholten
2002/0176450 A1*  11/2002  Kong et al. ............... 370/539
2003/0218981 A1*  11/2003  Scholten .................. 370/235
2011/0164533 A1*  7/2011  Krumel ..................... 370/255

FOREIGN PATENT DOCUMENTS

WO          97/23076         6/1997

OTHER PUBLICATIONS

International Telecommunication Union, "Interfaces for the Optical Transport Network (OTN)", ITU-T, Recommendation G.709/Y.1331, Feb. 2012, 232 pages.
International Telecommunication Union, "Generic framing procedure", ITU-T, Recommendation G.7041/Y.1303, Apr. 2011, 82 pages.

* cited by examiner

*Primary Examiner* — Charles C Jiang
*Assistant Examiner* — George Atkins, Jr.
(74) *Attorney, Agent, or Firm* — Dennis R. Haszko

(57) ABSTRACT

A GFP frame filter is provided to filter GFP frame data based on extracted GFP header data. The header data comprises EXI, PTI, and UPI fields. The header data can also comprise a generic header that can be customized to provide additional GFP frame filtering applications. The GFP frame filter comprises a plurality of programmable filters arranged to process GFP header data in parallel according to various programmable filter configurations. The plurality of programmable filters can be configured to operate in conjunction in a particular sequence.

23 Claims, 8 Drawing Sheets

| Filter No. | Select Generic 520 | Type field Mask 521 | Type field value 522 | Compare operator 523 | Action 524 | Continuation operator 525 | Next filter offset 526 | Match indicator 527 |
|---|---|---|---|---|---|---|---|---|
| 0 | 0 | EXlm=1111<br>PTlm=111<br>UPlm=8'hFF | EXlv=0000<br>PTlv=000<br>UPlv=8'h01 | EXlc=00<br>PTlc=00<br>UPlc=00 | 01 | 0 | 1111 | USE_EXl_SET=1<br>USE_PTl_SET=1<br>USE_UPl_SET=1<br>eCMF=0 |
| 1 | 0 | EXlm=1111<br>PTlm=111<br>UPlm=8'hFF | EXlv=0000<br>PTlv=100<br>UPlv=8'h00 | EXlc=00<br>PTlc=00<br>UPlc=01 | 10 | 0 | 0010 | USE_EXl_SET=0<br>USE_PTl_SET=0<br>USE_UPl_SET=0<br>eCMF=0 |
| 2 | 0 | EXlm=0000<br>PTlm=000<br>UPlm=8'h00 | EXlv=0000<br>PTlv=000<br>UPlv=8'h00 | EXlc=00<br>PTlc=00<br>UPlc=00 | 10 | 0 | 1111 | USE_EXl_SET=0<br>USE_PTl_SET=0<br>USE_UPl_SET=0<br>eCMF=0 |
| 3 | 0 | EXlm=1111<br>PTlm=111<br>UPlm=8'hFF | EXlv=0000<br>PTlv=100<br>UPlv=8'h06 | EXlc=00<br>PTlc=00<br>UPlc=10 | 00 | 0 | 1111 | USE_EXl_SET=1<br>USE_PTl_SET=1<br>USE_UPl_SET=1<br>eCMF=1 |
| 4 | 0 | EXlm=0000<br>PTlm=000<br>UPlm=8'h00 | EXlv=0000<br>PTlv=000<br>UPlv=8'h00 | EXlc=00<br>PTlc=00<br>UPlc=00 | 10 | 0 | 1111 | USE_EXl_SET=0<br>USE_PTl_SET=0<br>USE_UPl_SET=0<br>eCMF=0 |

FIG. 7

| Filter No. | Select Generic 520 | Type field Mask 521 | Type field value 522 | Compare operator 523 | Action 524 | Continuation operator 525 | Next filter offset 526 | Match indicator 527 |
|---|---|---|---|---|---|---|---|---|
| 0 | 0 | EXIm=1111<br>PTIm=111<br>UPIm=8'hFF | EXIv=0000<br>PTIv=000<br>UPIv=8'h0D | EXIc=00<br>PTIc=00<br>UPIc=00 | 01 | 0 | 1111 | USE_EXI_SET=1<br>USE_PTI_SET=1<br>USE_UPI_SET=1<br>eCMF=0 |
| 1 | 0 | EXIm=1111<br>PTIm=111<br>UPIm=8'hFF | EXIv=0000<br>PTIv=000<br>UPIv=8'h10 | EXIc=00<br>PTIc=00<br>UPIc=00 | 01 | 0 | 1111 | USE_EXI_SET=1<br>USE_PTI_SET=1<br>USE_UPI_SET=1<br>eCMF=0 |
| 2 | 0 | EXIm=1111<br>PTIm=111<br>UPIm=8'hFF | EXIv=0000<br>PTIv=100<br>UPIv=8'h00 | EXIc=00<br>PTIc=00<br>UPIc=01 | 11 | 0 | 0010 | USE_EXI_SET=0<br>USE_PTI_SET=0<br>USE_UPI_SET=0<br>eCMF=0 |
| 3 | 0 | EXIm=0000<br>PTIm=000<br>UPIm=8'h00 | EXIv=0000<br>PTIv=000<br>UPIv=8'h00 | EXIc=00<br>PTIc=00<br>UPIc=10 | 10 | 0 | 1111 | USE_EXI_SET=0<br>USE_PTI_SET=1<br>USE_UPI_SET=0<br>eCMF=0 |
| 4 | 0 | EXIm=1111<br>PTIm=111<br>UPIm=8'hFF | EXIv=0000<br>PTIv=100<br>UPIv=8'h06 | EXIc=00<br>PTIc=00<br>UPIc=10 | 11 | 1 | 1111 | USE_EXI_SET=1<br>USE_PTI_SET=1<br>USE_UPI_SET=1<br>eCMF=1 |
| 5 | 0 | EXIm=0000<br>PTIm=000<br>UPIm=8'h00 | EXIv=0000<br>PTIv=000<br>UPIv=8'h00 | EXIc=00<br>PTIc=00<br>UPIc=00 | 10 |  | 1111 | USE_EXI_SET=0<br>USE_PTI_SET=0<br>USE_UPI_SET=0<br>eCMF=0 |

FIG. 9

GFP FRAME FILTER

CROSS REFERENCE TO RELATED APPLICATIONS

This application claims the benefit of priority of U.S. Provisional Patent Application No. 61/709,009 filed Oct. 2, 2012, which is incorporated herein by reference in its entirety.

FIELD

The present disclosure relates generally to the field of data communications.

BACKGROUND

Generic Framing Procedure ("GFP") is an encapsulation technique defined by the International Telecommunication Union standard ITU-T G.7041. GFP provides mapping of traffic from higher-layer packet-oriented client signals over a transport network.

A GFP frame can be categorized as a Client Data Frame, Client Management Frame or a Management Communication Frame. A GFP frame can also be classified based on the traffic carried by the GFP frame. GFP client data frames carry client data in the payload bytes of the GFP frame, and GFP client management frames transport management information in the payload bytes of the GFP frame.

For each GFP frame categorization, action must be taken to forward the GFP frame to next data path block or to a firmware accessible FIFO (First In First Out) memory, or to raise and clear a particular defect interrupt event. These categorization or classification of frames in order to perform these actions is referred to in this disclosure as GFP frame filtering.

GFP frame filtering is done on a frame by frame basis and is typically accomplished by examining a header of the GFP frame. FIG. 1 illustrates a diagram of a GFP frame 100. The core header 110 includes a 16-bit payload length indicator (PLI) 111, and a core header error control field 112, both of which are used in frame delineation. The payload 120 includes a payload header area 121 varying in size from 4 to 64 bytes, a client payload information field 122 and an optional payload frame check sequence 123.

FIG. 2 illustrates a diagram of the payload header area 121. Bytes 5 and 6 of the GFP frame 100 define a type header field 210, which is further illustrated in FIG. 3 and discussed below. In FIG. 2, bytes 7 and 8 define the type header error control (tHEC) field 220. The bytes following the tHEC define the extension header field 230, which can vary from 0 to 58 bytes in length. The last two bytes of the payload header define the extension header error control (eHEC) field 240.

In FIG. 3, the type header field 210 includes a payload type identifier (PTI) field 211, a payload FCS (frame check sequence) identifier (PFI) bit 212, an extension header identifier (EXI) field 213, and a user payload identifier (UPI) field 214.

A GFP frame filter commonly considers the PTI, EXI and UPI fields 211, 213 and 214 for frame filtering. Depending on the values and combinations of values of the fields, the filter will perform a particular action on the frame. A conventional GFP frame filter comprises an arrangement of register-transfer level (RTL) combinatorial logic gates (AND, OR, XOR, NOT) to execute the function of evaluating the type fields.

However, this conventional GFP frame filter implementation is inflexible to changing application requirements. Because the filter is implemented as RTL combinatorial logic gates, the filter cannot be modified to perform different actions from the actions specified in the filter design. Furthermore, a GFP filter implemented in RTL logic gates cannot adapt to recognize new GFP field definitions yet to be specified, or to recognize custom field definitions specified by an application or a user.

BRIEF DESCRIPTION OF DRAWINGS

FIG. 7 is a table comprising an exemplary programmable filter configuration for the embodiment of FIG. 6.

FIG. 9 is a table comprising an exemplary programmable filter configuration for the embodiment of FIG. 8.

DETAILED DESCRIPTION

Figure 1:
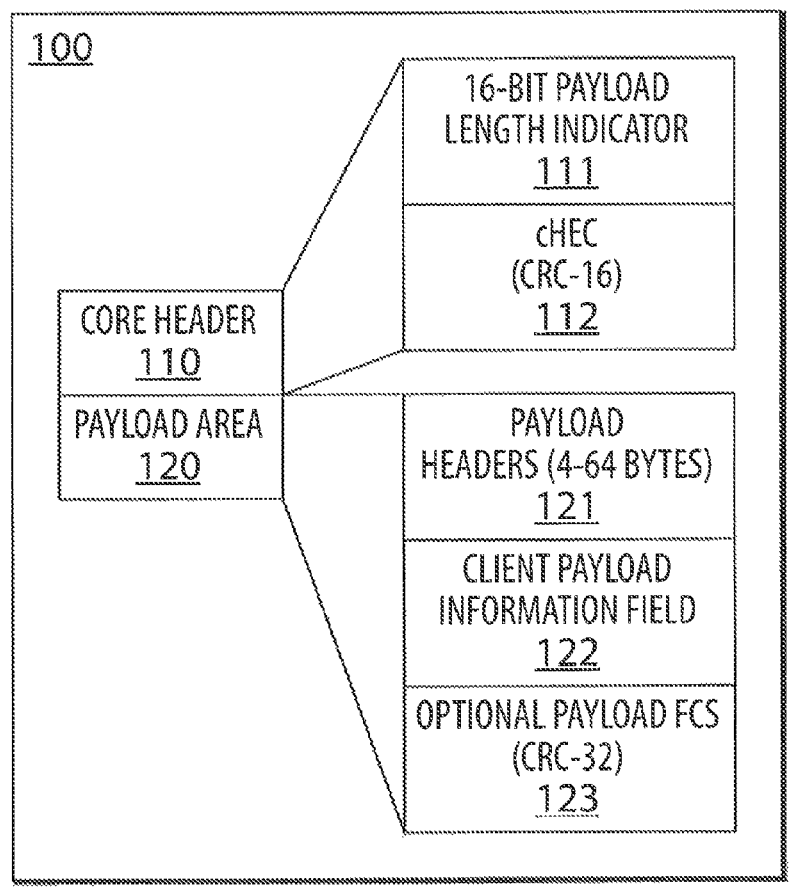
FIG. 1 is a diagram illustrating a general structure of a GFP frame.

A GFP frame filter according to an embodiment of the present disclosure provides a programmable and scalable method of filtering GFP frames according to GFP payload header field information.

The GFP frame filter is provided to filter GFP frame data based on extracted GFP header data. The header data comprises EXI, PTI, and UPI fields. The header data can also comprise a generic header that can be customized to provide additional GFP frame filtering applications. The GFP frame filter comprises a plurality of programmable filters arranged to process GFP header data in parallel according to various programmable filter configurations. The plurality of programmable filters can be configured to operate in conjunction in a particular sequence.

According to an embodiment, the present disclosure provides a method of filtering GFP data, the method comprising: receiving a GFP frame; extracting at least one GFP frame header from the GFP frame; processing the at least one GFP frame header using a selected programmable filter by: comparing the at least one GFP frame header to a configuration programmed in the selected programmable filter, and generating a programmable filter output; and evaluating an output of the selected programmable filter by performing an action specified by the programmable filter configuration based on the programmable filter output.

In a further embodiment, the selected programmable filter is among a set of programmable filters having processed a GFP frame, the set of programmable filters each having an associated programmable filter configuration, and wherein the method further comprises: evaluating outputs of the set of programmable filters by performing an action specified by the associated programmable filter configurations based on the outputs of the set of programmable filters.

In a further embodiment, the set of programmable filters perform the processing in parallel.

In a further embodiment, the at least one GFP frame header comprises a payload type identifier header, an extension header identifier header and a user payload identifier header.

In a further embodiment, the at least one GFP frame header comprises a generic frame header.

According to another embodiment, the present disclosure provides a GFP frame filter comprising: a plurality of programmable filters, each programmable filter to receive extracted GFP header data and an associated programmable filter configuration, and to process the extracted GFP header data according to the associated programmable filter configuration in order to generate an output; and a programmable filter evaluation means to evaluate the output from at least one of the plurality of programmable filters and to perform an action specified by the associated programmable filter configuration based on the programmable filter output.

In a further embodiment, the plurality of programmable filters process the extracted GFP header data in parallel.

In a further embodiment, the extracted GFP header data comprises a payload type identifier header, an extension header identifier header and a user payload identifier header.

In a further embodiment, the extracted GFP header data comprises a generic frame header.

In a further embodiment, the action specified by the configuration comprises an exit condition.

In a further embodiment, the action specified by the configuration comprises a next filter offset referring to a subsequent programmable filter to be evaluated.

In a further embodiment, the action specified by the configuration comprises modifying an event flag.

In a further embodiment, the action specified by the configuration comprises forwarding the GFP frame to an egress interface.

In a further embodiment, the action specified by the configuration comprises forwarding the GFP frame to a CPU.

In a further embodiment, the action specified by the configuration comprises dropping the GFP frame.

In a further embodiment, the action specified by the configuration comprises dropping the GFP frame and storing the user payload identifier header.

Figure 4:
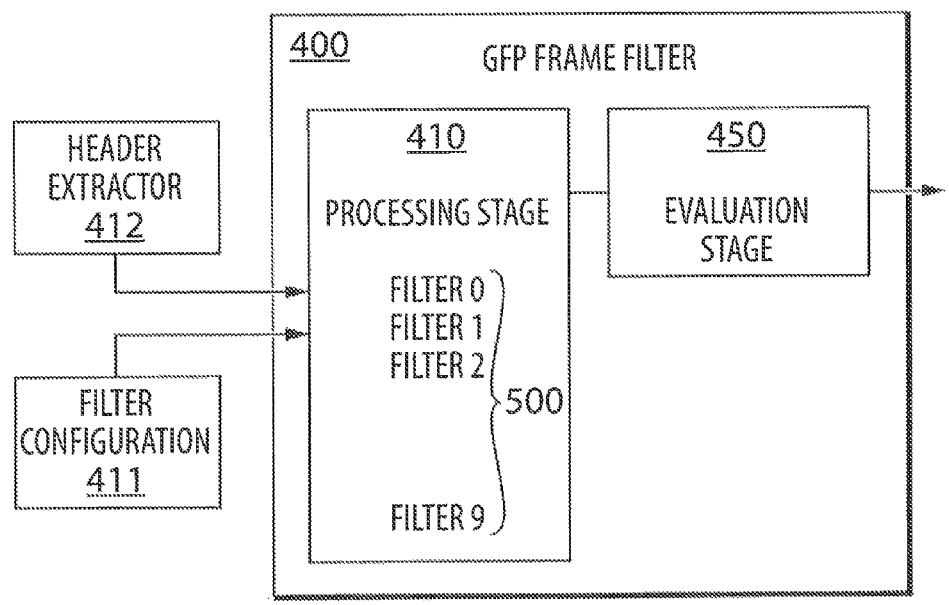
FIG. 4 is a diagram of a GFP frame filter according to an embodiment of the present disclosure.

FIG. 4 shows a GFP frame filter 400 according to an embodiment of the present disclosure. Generally, the filter 400 comprises two stages: a processing stage 410 and an evaluation stage 450. The processing stage 410 comprises a plurality of individual programmable filters 500 in parallel. In the embodiment shown in FIG. 4, the processing stage 410 comprises ten filters 500, Filter 0 through Filter 9. Each individual programmable filter 500 of the processing stage 410 receives the payload header fields 121 extracted from the GFP frame 100 and a filter configuration 411. While identical payload header fields 121 are provided to each filter 500, each filter's configuration 411 can be unique.

Figure 5:
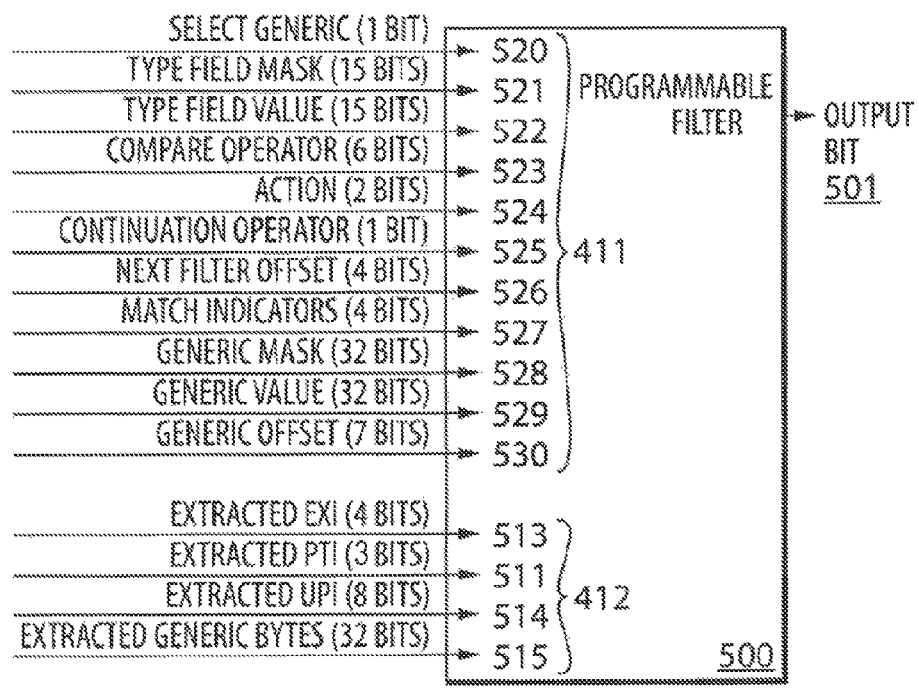
FIG. 5 is a diagram of an individual programmable filter from the GFP frame filter according to an embodiment of the present disclosure.

FIG. 5 shows a diagram of an individual programmable filter 500. Programmable filter 500 receives inputs from two sources: a header field extractor 412 and a filter configuration 411. The header field extractor provides extracted EXI bits 513, extracted PTI bits 511, extracted UPI bits 514, and extracted generic bytes 515. The extracted generic bytes 515 correspond to four bytes of the GFP frame 100 at an offset given by a generic offset bits 530 configuration.

Continuing to the configuration inputs, the filter configuration 411 provides each programmable filter 500 with a select generic bit 520, type fields mask bits 521, type field value bits 522, compare operator bits 523, action bits 524, a continuation operator bit 525, next filter offset bits 526, match indicator bits 527, the above-mentioned generic offset bits 530, generic mask bits 528, and generic value bits 529.

The following is a description of the functions of each of the programmable filter configuration inputs.

The select generic bit 520 indicates whether the individual programmable filter 500 will examine the header bits extracted from the type header fields 210 or the extracted generic header bits 515. Specifically, the select generic bit 520 configuration determines whether the filter 500 comparing relies on the type fields mask bits 521 and type fields value bits 522 or whether the comparison relies on the generic offset bits 530, generic mask bits 528 and generic value bits 529.

The type fields mask bits 521 give the mask for the GFP frame fields. This configuration input is used when the select generic bit 520 is set to '0' and is ignored when the select generic bit 520 is set to '1'. The mask 521 indicates which of the EXI, PTI and UPI bits 513, 511 and 514 will be examined.

The type fields value bits 522 indicate the value with which the masked GFP frame fields are compared. This configuration input is only valid when the select generic bit 520 is set to '0'.

The compare operator bits 523 function depends on the select generic bit 520 configuration. If the select generic bit 520 is set to '0', then the six bits of the compare operation 523 field functions as 2 bit operator selection bits for each of the three type header field bits 511, 513 and 514. That is, the first two bits correspond to the EXI header bits 513, the second two bits correspond to the PTI header bits 511, and the last two bits correspond to the UPI header bits 514.

If the select generic bit 520 is set to '1', then only the first two bits of the compare operator bits 523 are valid. These two bits set the compare operation for generic field comparison.

The compare operator selection bits 523 function according to the following rule: if the selection bits are '00', then the compare operator is "equal to"; if the selection bits are '01', then the compare operator is "greater than"; if the selection bits are '10', then the compare operator is "less than"; if the selection bits are '11', then the compare operator is "not equal to". Therefore, for type field comparison, the programmable filter 500 can compare each type field according to different comparison operators. For example, the programmable filter 500 can return a pass value for output bit 501 if the GFP frame header EXI bits 513 value is greater than '0b0100' and the PTI bits 511 value is less than '0b010' and the filter does not care about the UPI bits 514 value (i.e., the UPI is masked out); otherwise, the programmable filter returns a fail value for output bit 501.

The action bits 524 determine which action is performed when the header field comparison returns a pass value for output bit 501. The two action bits 524 configure the programmable filter 500 to operate according to the following rules: if the action bits 524 are '00', then forward the GFP frame 100 to a CPU; if the action bits 524 are '01', then forward the GFP frame 100 to an egress interface; if the action bits 524 are '10', then drop the GFP frame 100; if the action bits 524 are '11', then drop the GFP frame 100 and store the UPI header field 514 value in a common client signal fail (CSF) status FIFO, to be read by the CPU. If the header comparison failed (i.e., returned a fail value for output bit 501) then no action is taken by the programmable filter 500.

The continuation operator bit 525 indicates whether to merge the current action with a previous programmable filter's action or whether to override the previous programmable filter's action. The continuation operator bit 525 is only valid if the programmable filter comparison passed; if the comparison failed then the continuation operator bit 525 is ignored and the previous programmable filter's action is not disturbed.

The next filter offset bits 526 references the identifier of the next programmable filter 500 of the plurality of parallel programmable filters in the processing stage 410 to be evaluated during the evaluation stage 450. The significance of the next filter offset bits 526 will become evident in the forthcoming description of the evaluation stage 450. The next filter offset bits 526 are only executed if the header comparison passed. If the header comparison failed then the next filter offset bits 526 are ignored. A next filter offset bits 526 value of '0b1111' refers to an exit condition. Similarly, a next filter offset bits 526 value that exceeds the largest filter 500 identifier offset value will cause an exit condition as well.

The four match indicator bits 527 are used to derive mismatch events. The first match indicator bit is set when looking for a particular value of EXI 513 in the received frame. The second match indicator bit is set when looking for a particular value of PTI 511 in the received frame. The third match indicator bit is set when looking for a particular value of UPI 514 in the received frame; however, if the select generic bit 520 is set to '1', then the third match indicators bit is used for generating a generic filter mismatch event. The fourth match indicator bit is set to register a CSF event when the header comparison passes. A CSF is a particular type of GFP frame where the PTI field of the frame is '0b100'. When the programmable filter 500 identifies this condition, it registers a CSF event.

Figure 2:
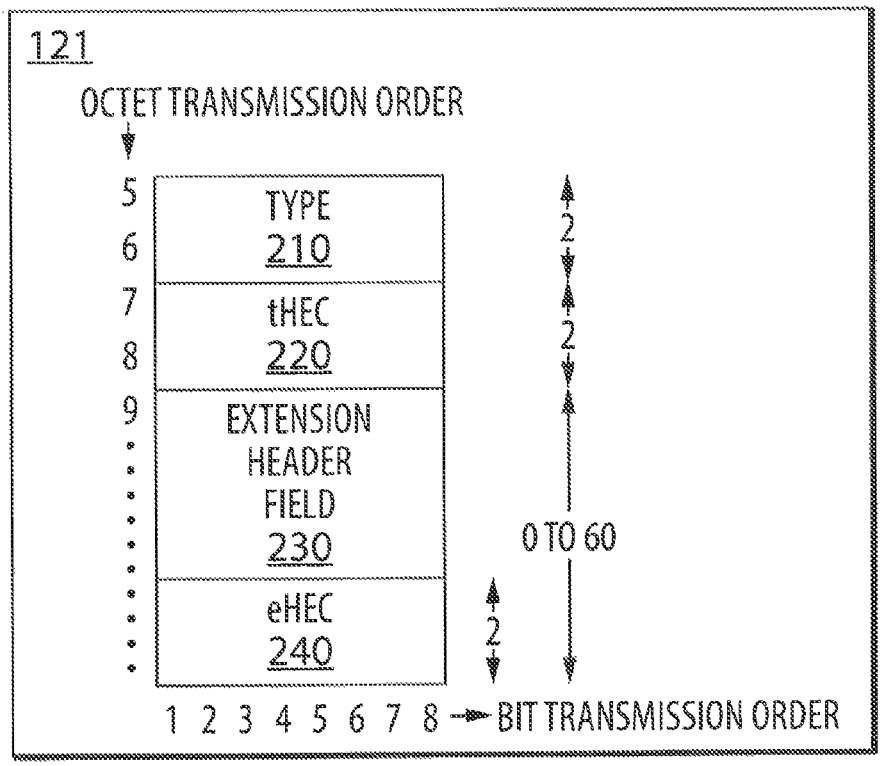
FIG. 2 is a diagram illustrating a structure of a GFP payload header.
Figure 3:
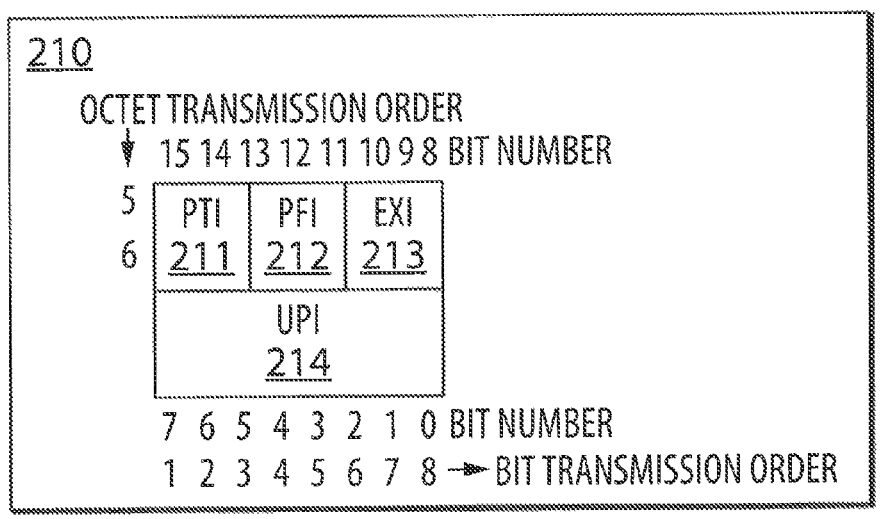
FIG. 3 is a diagram illustrating a structure of a GFP type header.

As shown in FIG. 2, the extension header field 230 can vary from 0 to 58 bytes in length. Therefore, in total, the GFP frame headers (core header, cHEC, type header, tHEC, extension header and eHEC) can be up to 68 bytes in length. The generic header 515 of FIG. 5 can be located at an offset location within these 68 bytes. In the present embodiment, the generic header 515 is located in the extension header field 230. The generic header 515 is a custom data sequence that an application or user can employ to perform GFP frame filtering. Generic header field definitions expand the GFP frame filtering possibilities beyond what is available from the defined type header fields. Referring to FIG. 5, the generic offset bits 530 configuration input for each programmable filter 500 gives the position of the first of the four bytes defining the generic header field 515, beginning at the first byte of the GFP frame. For example, a value '0b0001010' of a generic offset 530 indicates that the generic header field begins at the 10th byte of the GFP frame 100 and ends, inclusively, at the 13th byte of the GFP frame 100.

The generic mask bits 528 define a 4 byte mask applied to the 4 bytes of the incoming GFP frame 100 at an offset specified by the generic offset 530 from the start of GFP frame 100.

The generic value bits 529 define a 4 byte value that the programmable filter 500 compares to the 4 bytes in the incoming GFP frame 100 at an offset given by the generic offset 530 and masked by the generic mask 528.

Referring back to FIG. 4, the processing stage 410 comprises ten individual programmable filters 500 operating in parallel, each filter 500 having a particular filter configuration 411. Based on this filter configuration and the extracted header fields of the GFP frame, each filter 500 generates a pass or fail output bit 501.

In the embodiment of FIG. 4 the evaluation stage 450 receives the result of each of the ten individual programmable filters 500. The evaluation stage 450 processes the result of each filter 500 one at a time, in a specific order determined by each filter's next filter offset bits 526. The evaluation stage 450 begins processing the first filter 500 by numerical identifier.

The evaluation stage 450, for any single filter 500, evaluates whether the filter returns a pass bit or a fail output bit 501. If a filter 500 returns a pass value for output bit 501, the evaluation stage 450 performs the action specified by the filter 500 and either overrides the previously accumulated actions or merges the current action with the previously accumulated actions. Before evaluating any filter 500, the evaluation stage begins with a default "drop" action; thus, if all of the filters 500 are evaluated with fail value output bits 501, none of the actions specified by the filters 500 will be executed and the frame will be dropped. The evaluation stage 450 proceeds to evaluate the output bit 501 of the first numerically identified filter 500, and continues through a series of filters 500 specified by evaluation rules, described below, until the evaluation stage 450 reaches an exit condition.

If a filter 500 returns a fail value for output bit 501, the accumulated actions from the previously evaluated filters 500 are not disturbed and the action 524 specified by the currently evaluated filter 500 is ignored. The next filter offset 526 of the currently evaluated filter 500 is also ignored. Thus, the evaluation stage 450 proceeds to evaluate the next filter 500 in numerical order of identity. For example, the evaluation stage 450 evaluates Filter 0 first. Filter 0 returns a pass value for output bit 501 and points to Filter 5 next. The evaluation stage 450 then evaluates Filter 5, which in this scenario returns a fail value for output bit 501 and points to Filter 9. The evaluation stage 450 ignores the next filter offset 526 reference to Filter 9 and proceeds to evaluate the next numerical filter, which is Filter 6 in this case.

In addition to evaluating the results of individual programmable filters 500, in the embodiment of FIG. 4, the evaluation stage 450 also maintains five event flags. The five event flags comprise an EXI mismatch flag, a PTI mismatch flag, a UPI mismatch flag, a generic filter mismatch flag and a CSF event flag. The mismatch flags are used in relation to the aforementioned match indicator bits 527.

In an embodiment, at the beginning of the evaluation stage 450 of a GFP frame, before any individual programmable filter 500 is evaluated, the EXI, PTI and UPI mismatch flags are initialized to '1', the the generic filter mismatch flag is initialized to '0', and the CSF event flag is initialized to '0'.

If the evaluation stage 450 evaluates an individual programmable filter 500 that passes, the match indicator bits 527 will cause the corresponding mismatch flags (EXI, PTI and UPI) to be de-asserted to '0'. At the end of the evaluation, the PTI and UPI mismatch flags are Boolean-OR combined to generate a common PTI/UPI mismatch flag.

Alternatively, if the select generic bit 520 is set to true, then the generic filter mismatch flag is asserted to '1' if the filter 500 returns a fail bit and the filter's generic filter bit (shared with the UPI match indicators bit) of the match indicator bit 527 is set to '1'. Otherwise, the generic filter mismatch flag is de-asserted if the filter 500 returns a pass value for output bit 501. The generic filter mismatch flag is not disturbed if the select generic bit 520 is set to '0' or the generic filter match indicators bit is set to '0'.

The CSF event flag is asserted when a filter 500 is evaluated as returning a pass value for output bit 501 and the CSF bit of the match indicator bits 527 is asserted.

As the evaluation stage 450 processes any number of individual programmable filters 500 one at a time, the evaluation stage updates the five event flags described above after each filter evaluation. Thus, at the end of the evaluation stage 450, the five event flags represent the EXI, PTI, UPI, generic filter mismatches and the CSF event statuses of the entire programmable filter sequence.

Figure 6:
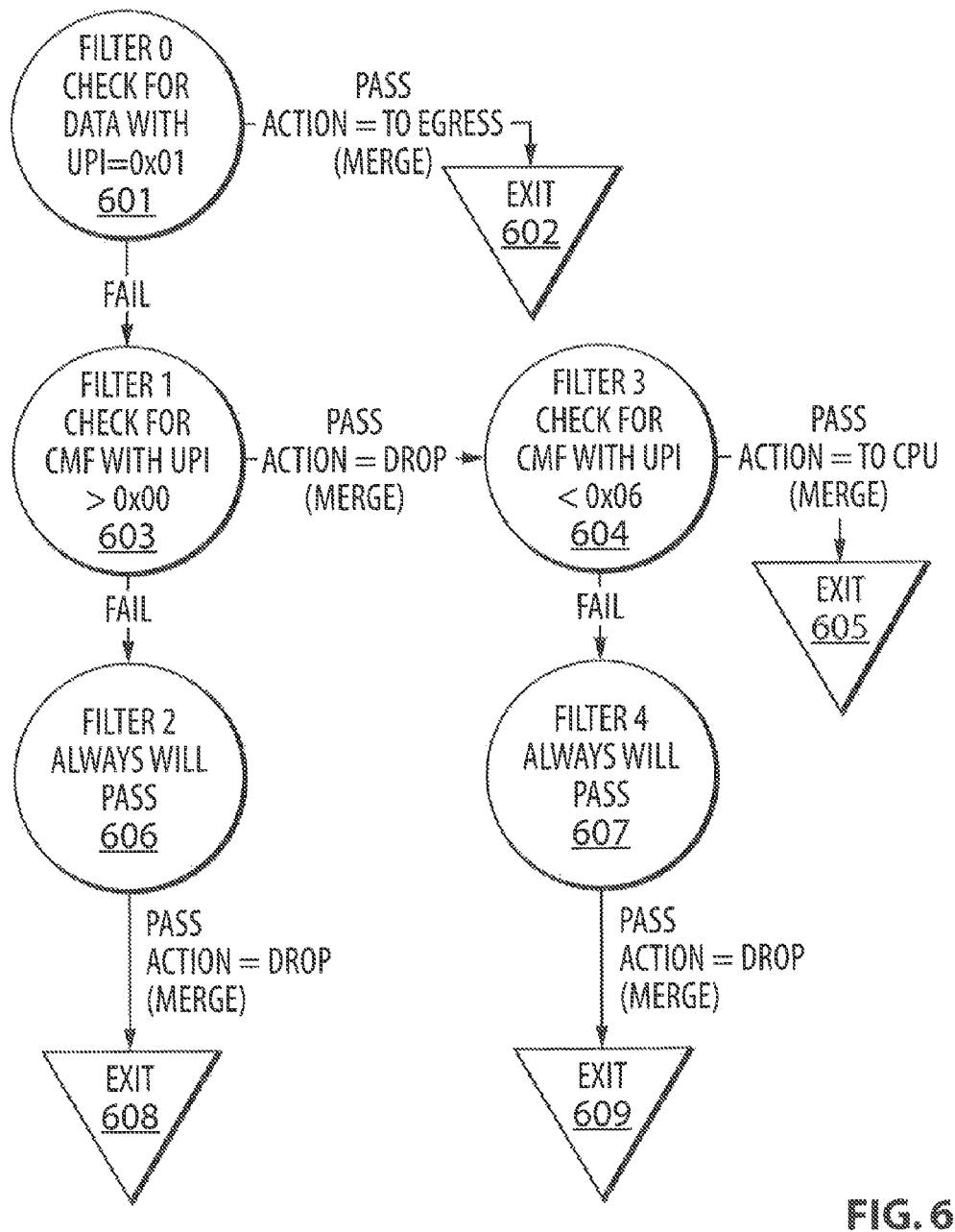
FIG. 6 is a flow chart illustrating an exemplary evaluation procedure according to an embodiment of the present disclosure.

Reference is now made to FIG. 6, which illustrates a flowchart describing operation of an exemplary instance of a programmed filter configuration according to the embodiment of FIG. 4. In this example, the GFP frames 100 carry Ethernet data. Thus, Ethernet is the upper-layer application data mapped into the GFP frames. The same data channel also carries GFP client management frames (CMF).

For background instruction, it is useful to note exemplary type header field 210 values that have been defined. PTI values of 0b000, 0b100 and 0b101 refer to a Client Data Frame, a Client Management Frame and a Management Communication Frame, respectively. EXI values of 0x0, 0x1, and 0x2 refer to a NULL extension header, a linear frame and ring frame, respectively. And UPI values indicate the type of client data traffic encapsulated in the GFP frame 100. For example, a UPI value of '0x01' indicates that the user payload is Ethernet data.

In this example, Ethernet client data frames need to be sent to the egress interface for processing by a downstream block; therefore: PTI=0b000, UPI=0x01, and EXI=0x0. CMF frames need to be sent to the CPU interface; therefore: PTI=0b100, UPI=0x01 to 0x05, and EXI=0x0. These application requirements can be implemented in the programmable GFP frame filter 400 of the present disclosure by configuring 5 filters 500, Filter 0 to Filter 4, according to the example of FIG. 6. The configuration of each filter 500 in the example of FIG. 6 can be found in the table of FIG. 7.

As described in the preceding, all individual programmable filters 500 are executed in parallel during the processing stage 410. The diagram of FIG. 6 shows the procedural evaluation of the individual programmable filters 500 during the evaluation stage 450. At the evaluation stage 450, each filter 500 returns a pass or fail status bit that was computed during the previous processing stage 410. The evaluation stage 450 further considers the action bits 524, the continuation operator bit 525 and the next filter offset bits 526 to implement the GFP frame filter 400 tree shown in FIG. 6.

At 601, Filter 0 checks for a client data frame by comparing the PTI field 511 to '0b000', corresponding to a client data frame, and by comparing the UPI field 514 to '0x01', corresponding to Ethernet data. If Filter 0 compares the PTI and UPI values 511 and 514 successfully then the GFP frame 100 containing Ethernet client data is sent to the egress interface. The next filter offset 526 of Filter 0 is '0b1111' which indicates that successful comparison leads to an exit condition 602 and the evaluation stage 450 terminates.

If the evaluation stage 450 determines that Filter 0 did not receive a client data frame, then the evaluation stage 450 proceeds to Filter 1, at 603. Filter 1 compares the PTI field 511 to '0b100' using an 'equal to' operator. Filter 1 also compares the UPI field 514 to '0x00' using a 'greater than' operator. A successful comparison causes the evaluation stage 450 to drop the frame (i.e., temporarily do nothing) and proceed using the next filter offset 526 value of '0b0010' to Filter 3, at 604. The next filter offset 526 value of '0b0010' represents the numerical difference between the numerical identifier of Filter 3 ('0b0011') and Filter 1 ('0b0001').

At Filter 3, the PTI field 511 is compared to '0b100' using an 'equal to' operator and the UPI field 514 is compared to '0x06' using a 'less than' operator. A successful comparison causes the evaluation stage 450 to forward the client management frame to the CPU, and the next filter offset 526 value of '0b1111' causes an exit condition 605, terminating the evaluation stage 450.

If either Filter 1 or Filter 3 comparison failed, caused by the GFP frame filter 400 receiving a non-client data frame and non-client management frame, the evaluation stage 450 ignores the next filter offset 526 value and proceeds to the next numerical filters, Filter 2 and Filter 4, at 606 and 607 respectively. Since the application specification requires that no action be taken for a non-client data frame and non-client management frame, both Filter 2 and Filter 4 are configured to be always true conditions and cause exit conditions 608 and 609 terminating the evaluation stage 450.

Filter 5 to Filter 9 of the GFP frame filter 400 of the embodiment of FIG. 6 are unused and can be kept un-programmed. Thus while the GFP frame filter 400 comprises a plurality of ten available filters, only a set of those ten filters, comprising Filter 0 to Filter 4, were used in processing and evaluating the GFP frame headers.

Figure 8:
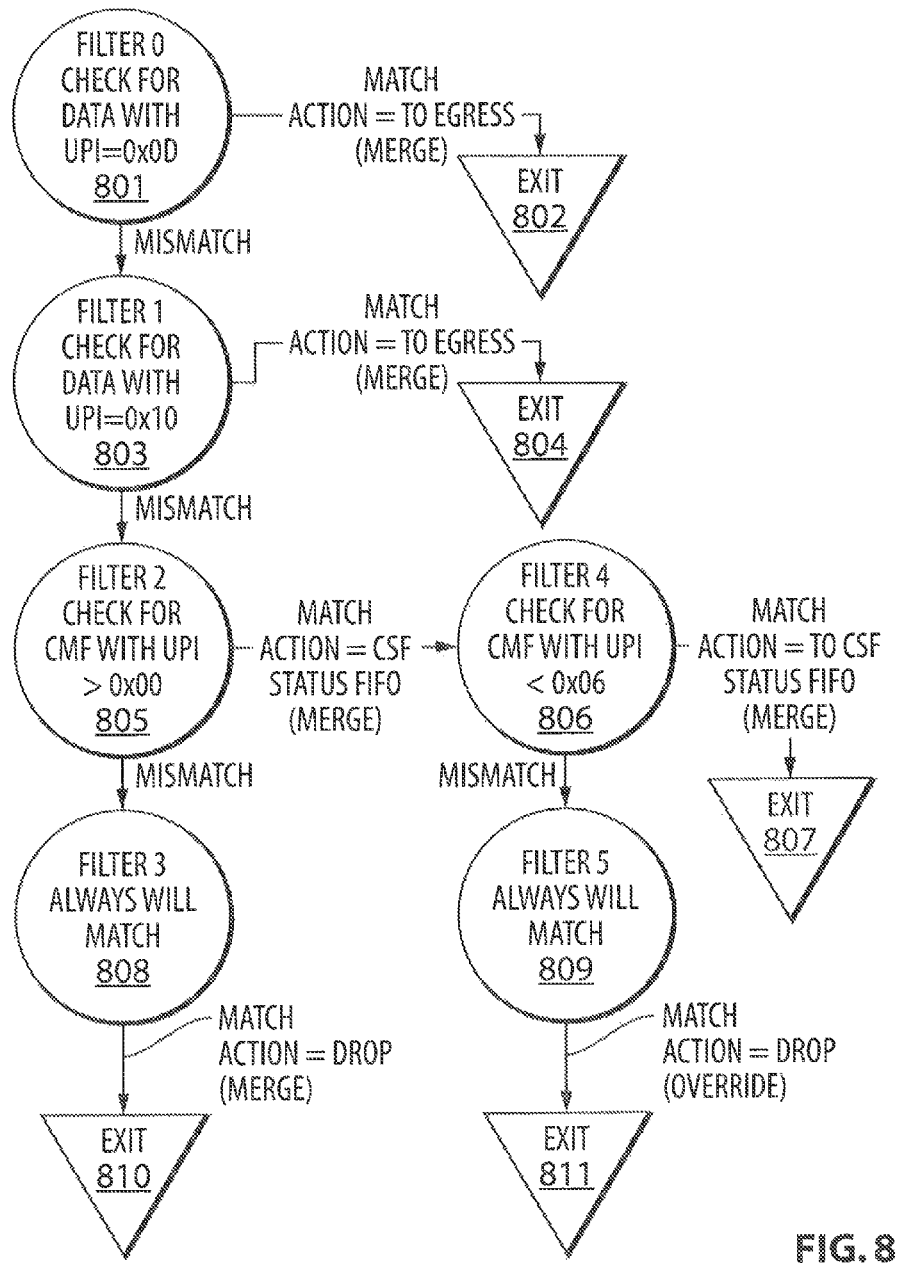
FIG. 8 is a flow chart illustrating another exemplary evaluation procedure according to an embodiment of the present disclosure.

Reference is now made to FIG. 8, which is illustrates another flowchart describing operation of an exemplary instance of a programmed filter 400 configuration according to the embodiment of FIG. 4. In this example, the GFP frames carry multiprotocol label switching (MPLS) data. The same data channel also carries GFP client management frames (CMF).

In this example, MPLS client data frames need to be sent to the egress interface for processing by a downstream block; therefore: PTI=0b000, UPI=0x0D or 0x10, and EXI=0x0. CMF frames do not need to be sent to the CPU interface since only the UPI value need to be stored in a CSF status FIFO to be read by the CPU; therefore: PTI=0b100, UPI=0x01 to 0x05, and EXI=0x0. These application requirements can be implemented in the programmable GFP frame filter 400 of the present disclosure by configuring 6 filters, Filter 0 to Filter 5, according to the example of FIG. 8. The configuration of each filter 500 in the example of FIG. 8 can be found in the table of FIG. 9.

At 801, Filter 0 checks for a MPLS mapped frame by comparing the UPI field 514 to 0x0D. If Filter 0 compares the UPI value 514 successfully then the GFP frame 100 containing Ethernet client data is sent to the egress interface. The next filter offset 526 of Filter 0 is '0b1111' which indicates that successful comparison leads to an exit condition 802 and the evaluation stage 450 terminates.

However, a UPI field 514 of 0x10 can also indicate that the GFP frame 100 is an IPv4 data frame. Therefore, if Filter 0 failed, then the evaluation stage 450 proceeds to Filter 1, at 803. Filter 1 compares the UPI field 514 to '0x10'. Similarly to Filter 0, the next filter offset 526 of Filter 1 is '0b1111' which indicates that successful comparison leads to an exit condition 804 and the evaluation stage 450 terminates.

If the evaluation stage 450 determines that Filter 1 did not receive a client data frame, then the evaluation stage 450 proceeds to Filter 2, at 805. Filter 2 compares the PTI field 511 to '0b100' using an 'equal to' operator. Filter 2 also compares the UPI field 514 to '0x00' using a 'greater than' operator. A successful comparison causes the evaluation stage 450 to drop the frame and store the UPI field in the CSF status FIFO, and to proceed using the next filter offset 526 value of '0b0010' to Filter 4, at 806.

At Filter 4, the PTI field 511 is compared to '0b100' using an 'equal to' operator and the UPI field 514 is compared to '0x06' using a 'less than' operator. A successful comparison causes the evaluation stage 450 to drop the frame and store the UPI field in the CSF status FIFO, and the next filter offset 526 value of '0b1111' causes an exit condition 807, terminating the evaluation stage 450.

If either Filter 2 or Filter 4 comparison failed, caused by the GFP frame filter 400 receiving a non-client data frame and non-client management frame, the evaluation stage 450 ignores the next filter offset 526 value and proceeds to the next numerically identified filters, Filter 3 and Filter 5, at 808 and 809 respectively. Since the application specification requires that no action be taken for a non-client data frame and non-client management frame, both Filter 3 and Filter 5 are configured to be always true conditions and cause exit conditions 810 and 811 terminating the evaluation stage 450. Filter 5 is configured with a continuation operator bit 525 value to override the action set by Filter 2 so that the action of storing the UPI field is changed to a frame drop.

Filter 6 to Filter 9 of the GFP frame filter 400 of the embodiment of FIG. 8 are unused and can be kept un-programmed.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a hardware product implemented in an Integrated Circuit (IC), Programmable Gate Array, or some combination of Integrated Circuit(s), Programmable Gate Array(s), and Software. Those of ordinary skill in the art will appreciate that other functions can also be implemented on such Integrated Circuits or Programmable Gate Arrays.

The above-described embodiments are intended to be examples only. Alterations, modifications and variations can be effected to the particular embodiments by those of skill in the art without departing from the scope, which is defined solely by the claims appended hereto.

What is claimed is:

1. A method of filtering Generic Framing Procedure (GFP) data of a GFP frame, the method comprising:
   receiving a filter configuration at each of a plurality of programmable filters;
   receiving GFP header data of the GFP frame at each of the plurality of programmable filters;
   processing the GFP header data using the plurality of programmable filters, wherein the processing at each filter is based on the filter configuration for the respective filter, wherein the filter configuration includes a next filter indicator, and wherein the processing at each filter further includes comparing received GFP header data to a value indicated in the respective filter configuration;
   outputting a filter result at each programmable filter based on the processing at the respective programmable filter; and
   evaluating the filter results at an evaluation stage, the evaluating comprising:
      evaluating the filter results in an order based on the next filter identifiers in the filter configurations of the programmable filters; and
      executing an action for the GFP frame based on the evaluating the filter results, where the action is specified in the filter configuration of at least one of the plurality of programmable filters.

2. The method of claim 1, wherein the plurality of programmable filters performs the processing in parallel.

3. The method of claim 1, wherein the GFP header data comprises at least two of a payload type identifier header, an extension header identifier header and a user payload identifier header, and wherein the processing the GFP header data using the plurality of programmable filters includes:
   processing, at a first programmable filter, header data in at least one of the payload type identifier header, the extension header identifier header, and the user payload identifier header; and
   processing, at a second programmable filter, header data in at least one of the payload type identifier header, the extension header identifier header, and the user payload identifier header not processed at the first programmable filter.

4. The method of claim 1, wherein the plurality of ordered programmable filters includes a generic filter configurable to process GPF header data from multiple GFP header fields in the GFP frame.

5. The method of claim 1, wherein the action specified by the configuration comprises an exit condition.

6. The method of claim 1, wherein the action specified by the configuration comprises a next filter offset referring to a subsequent programmable filter to be evaluated.

7. The method of claim 1, wherein the action specified by the configuration comprises modifying an event flag or dropping the GFP frame.

8. The method of claim 1, wherein the action specified by the configuration comprises forwarding the GFP frame to an egress interface or forwarding the GFP frame to a CPU.

9. The method of claim 3, wherein the action specified by the configuration comprises dropping the GFP frame and storing the user payload identifier header.

10. A Generic Framing Procedure (GFP) frame filter for processing GFP header data of a GFP frame, the filter comprising:
    a plurality of programmable filter circuits, each programmable filter circuit comprising:
       a first input circuit for receiving the GFP header data of the GFP frame;
       a second input circuit for receiving a filter configuration, wherein each programmable filter circuit is configured based on its received filter configuration to process the received GFP header data, wherein the filter configuration includes a next filter indicator, wherein the processing includes comparing received GFP header data to a value indicated in the filter configuration; and
       an output circuit for outputting a filter result according to the processing; and an evaluation stage circuit connected to the outputs of the plurality of programmable filter circuits for evaluating the filter results in an order based on the next filter identifiers in the filter configurations of the programmable filter circuits, the evaluating further comprising executing an action for the OFF frame based on the evaluating the filter results where the action is specified in the filter configuration of at least one of the plurality of programmable filter circuits.

11. The OFF frame filter of claim 10, wherein the plurality of programmable filter circuits processes the GFP header data in parallel.

12. The OFF frame filter of claim 10, wherein the OFF header data comprises at least one of a payload type identifier header, an extension header identifier header and a user payload identifier header, and wherein the plurality of programmable filter circuits comprises:
    a first programmable filter circuit for processing header data in at least one of the payload type identifier header, the extension header identifier header, and the user payload identifier header; and
    a second programmable filter circuit for processing header data in at least one of the payload type identifier header, the extension header identifier header, and the user payload identifier header not processed at the first programmable filter circuit.

13. The OFF frame filter of claim 10, wherein the plurality of ordered programmable filter circuits includes a generic filter circuit configurable to process GPF header data from multiple GFP header fields in the GFP frame.

14. The GFP frame filter of claim 10, wherein the action specified by the configuration comprises an exit condition.

15. The GFP frame filter of claim 10, wherein the action specified by the configuration comprises a next filter offset referring to a subsequent programmable filter to be evaluated.

16. The GFP frame filter of claim 10, wherein the action specified by the configuration comprises modifying an event flag.

17. The GFP frame filter of claim 10, wherein the action specified by the configuration comprises forwarding the GFP frame to a CPU or forwarding the GFP frame to an egress interface.

18. The GFP frame filter of claim 10, wherein the action specified by the configuration comprises dropping the GFP frame.

19. The GFP frame filter of claim 12, wherein the action specified by the configuration comprises dropping the GFP frame and storing the user payload identifier header.

20. The GFP frame filter of claim 10, wherein each programmable filter circuit has a numerical identifier and the numerical identifiers are sequential, and wherein the order for the evaluating the filter results is determined based on identifying a next filter circuit to have its result evaluated following the evaluation of the results of a previous filter circuit, wherein the next filter circuit is identified to be:
- the next filter identifier indicated in the filter configuration of the previous filter circuit when the result of the previous filter circuit is of a first type;
- the filter circuit having the next sequential numerical identifier following the numerical identifier of the previous filter circuit when the result of the previous filter circuit is of a second type.

21. The GFP frame filter of claim 20, wherein first type of filter result is a success and the second type of filter result is a failure.

22. The method of claim 1, wherein each programmable filter has a numerical identifier and the numerical identifiers are sequential, and wherein the order for the evaluating the filter results is determined based on identifying a next filter to have its result evaluated following the evaluation of the results of a previous filter, wherein the next filter is identified to be:
- the next filter identifier indicated in the filter configuration of the previous filter when the result of the previous filter is of a first type;
- the filter having the next sequential numerical identifier following the numerical identifier of the previous filter when the result of the previous filter is of a second type.

23. The method of claim 21, wherein first type of filter result is a success and the second type of filter result is a failure.

* * * * *